United States Patent
Sanders

(10) Patent No.: US 9,359,264 B2
(45) Date of Patent: *Jun. 7, 2016

(54) ANHYDROUS AMMONIA SUPPLEMENTED WITH AGRICULTURAL ACTIVES

(71) Applicant: Verdesian Life Sciences, LLC, Cary, NC (US)

(72) Inventor: John Larry Sanders, Leawood, KS (US)

(73) Assignee: Verdesian Life Sciences, LLC, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,970

(22) Filed: Aug. 14, 2015

(65) Prior Publication Data

US 2015/0353434 A1 Dec. 10, 2015

Related U.S. Application Data

(62) Division of application No. 14/285,272, filed on May 22, 2014, now Pat. No. 9,139,481.

(60) Provisional application No. 62/001,913, filed on May 22, 2014, provisional application No. 61/827,452, filed on May 24, 2013.

(51) Int. Cl.
*C05C 3/00* (2006.01)
*C05B 17/00* (2006.01)

(52) U.S. Cl.
CPC .. *C05C 3/00* (2013.01); *C05B 17/00* (2013.01)

(58) Field of Classification Search
CPC .................................. C05C 3/00; C05B 17/00
See application file for complete search history.

(56) References Cited

U.S. PATENT DOCUMENTS 2,976,138 A * 3/1961 Hester ...................... C05D 9/02
  71/1
9,139,481 B2 * 9/2015 Sanders .................... C05C 3/00

* cited by examiner

*Primary Examiner* — Wayne Langel
(74) *Attorney, Agent, or Firm* — Hovey Williams LLP

(57) ABSTRACT

Methods of formulating agriculturally useful compositions are provided wherein the compositions comprise individual quantities of anhydrous ammonia, ammonia solution, and one or more agricultural actives different than anhydrous ammonia. The compositions may include polyanionic polymers, fertilizers, and/or biocidal agents. Preferably, the compositions are created in pressurized tanks and are applied in the same fashion as anhydrous ammonia.

22 Claims, No Drawings

US 9,359,264 B2

ANHYDROUS AMMONIA SUPPLEMENTED WITH AGRICULTURAL ACTIVES

CROSS-REFERENCE TO RELATED APPLICATION

This application is a division of pending application Ser. No. 14/285,272, filed May 22, 2014, and claims the benefit of Provisional Application Ser. No. 61/827,452, filed May 24, 2013, and Ser. No. 62/001,913, filed May 22, 2014, all of which are incorporated by reference herein in their entireties.

BACKGROUND OF THE INVENTION

1. Field of the Invention

The present invention is broadly concerned with new agriculturally useful compositions comprising anhydrous ammonia supplemented with one or more types of agricultural actives. More particularly, the invention is concerned with such compositions, and methods of preparing and using the compositions. In general, the products include respective quantities of anhydrous ammonia, ammonia solution, and one or more agricultural actives.

2. Description of the Prior Art

Anhydrous ammonia is widely used as a fertilizer. This material is gaseous at normal ambient temperatures, and therefore is maintained under pressure in tanks to keep it in a liquid form prior to application Anhydrous ammonia is typically injected from a pressure tank into the soil below grade in order to inhibit the volatilization of the ammonia into the atmosphere. Although anhydrous ammonia has no pH owing to the fact that it is water-free, it is an extremely caustic material which must be handled with great care. For example, if water is injected into anhydrous ammonia, the result is a violent and uncontrolled exothermic reaction. Although not generally practiced, it has been known to mix fertilizer components with anhydrous ammonia prior to application thereof to the soil. See, e.g., U.S. Pat. No. 3,997,319, which describes the addition of zinc acetate to anhydrous ammonia to form a mixed fertilizer.

In recent years a series of U.S. patents have issued describing biodegradable polymers having significant agricultural facilities, particularly when used in combination with conventional fertilizers or pesticides. For example, U.S. Pat. No. 6,515,090 describes dicarboxylic copolymers made up, e.g., of moieties of itaconic acid and maleic anhydride. This patent also discloses that such copolymers may be partially neutralized with metal or other cations, and can be used to form composite products with fertilizers. These combined fertilizer-copolymer products have been shown to increase the availability of phosphorous and other nutrients for uptake by growing plants, and can be applied to soil adjacent the plants or in foliar applications. Moreover, these copolymers can be used to good effect in combination with various pesticides, as described in U.S. Pat. No. 7,655,597. Polymers in accordance with the '090 and '597 patents are commercially available from Specialty Fertilizer Products, LLC of Leawood, Kans. under the designations NUTRISPHERE-N® and AVAIL®. NUTRISPHERE-N® is a 40% by weight solids aqueous copolymer of substantially equimolar amounts of itaconic and maleic anhydride moieties partially neutralized with calcium ion (CAS#877469-38-0) and having a pH of 2.5-5. AVAIL® is a 40% by weight solids aqueous copolymer of substantially equimolar amounts of itaconic and maleic anhydride moieties partially neutralized with sodium ion (CAS#556055-76-6) and having a pH of 6-8.

As indicated, these synthetic polymers are provided as aqueous mixtures containing approximately 40% by weight polymer. Therefore, these aqueous polymer mixtures are not suitable for direct injection into anhydrous ammonia even though, from a plant nutrition standpoint, such mixtures would be highly useful.

Similarly, other types of solid or liquid agriculturally useful ingredients could be advantageously mixed with anhydrous ammonia, except for the tendency of solids to segregate from anhydrous ammonia, and/or because of the presence of water.

There is accordingly a need in the art for new agriculturally useful compositions and methods permitting actives such valuable fertilizers to be incorporated into anhydrous ammonia without experiencing the aforementioned problems.

SUMMARY OF THE INVENTION

Broadly speaking, the compositions of the invention are liquid mixtures containing at least three components, namely anhydrous ammonia as the preponderant component, with ammonia solution and one or more agricultural actives. The pH of the compositions is typically from about 8-13, more preferably from about 9.5-11.5. The compositions can be applied to soil in the same manner as anhydrous ammonia, e.g., by injection into the earth behind a coulter blade, with a follower wheel to close the soil opening generated by the coulter blade.

As used herein, "ammonia solution" refers to weakly basic solutions of ammonia in water which may be denoted by the symbol $NH_3(aq)$, and which may be referred to in the art as ammonium hydroxide, ammonia water, ammonia liquor, aqua ammonia, aqueous ammonia, or simply ammonia. While the term "ammonium hydroxide" suggests a base with the composition $[NH_4^+][OH^-]$, it is virtually impossible to isolate samples of $NH_4OH$, inasmuch as these ions do not comprise a significant fraction of the total amount of ammonia in an ammonia solution, except in the case of extremely dilute ammonia solutions.

A wide variety of agricultural actives are useful in the invention, and as used herein "agricultural actives" refers to any ingredient which has a beneficial effect upon soil, soil amendments, fertilizers, seeds, germination of seeds, plant growth, and/or harvesting of plants. For example, the actives may include synthetic resin polymers (e.g., monomeric polymers such as polyvinylic or polyaspartic polymers, or copolymers containing two or more repeat units or moieties, such as maleic-itaconic copolymers). As used herein, the term "polymer" or "polymers" refers to any type of polymeric species, such as homopolymers containing only a single polymeric unit, or copolymers containing two or more different polymeric units; this term also embraces acid forms of the polymers, as well as partial or complete salts thereof.

Other agricultural actives include fertilizers such as ammoniacal, phosphate, potassium, minerals (e.g., secondary nutrients and micronutrients), and mixed NPK fertilizers; the fertilizers may be organic or manufactured, in solid or liquid form. Additionally, biocidal actives (e.g., pesticides and/or herbicides) may also be employed.

DETAILED DESCRIPTION OF THE PREFERRED EMBODIMENTS

The new compositions of the invention are in the form of liquids with anhydrous ammonia being the preponderant ingredient, generally at a level of from about 60-90% by weight of the overall product, in combination with agricultural active(s) and ammonia solution. In preferred forms, the actives include one or more polyanionic polymers described below.

The Polyanionic Polymers

Generally speaking, the polymers of the invention should have a molecular weight of about 500-5,000,000, more preferably from about 1500-50,000, and contain at least three and preferably more repeat units per molecule (preferably from about 10-500). Moreover, the partial or complete salts of the polymers should be water dispersible and preferably water soluble, i.e., they should be dispersible or soluble in pure water to a level of at least about 5% w/w at room temperature with mild agitation.

Advantageously, at least about 50% (by mole) of repeat units contain at least 1 carboxylate group. These species also are typically capable of forming stable solutions in pure water up to at least about 20% w/w solids at room temperature.

To summarize, the preferred polymers of the invention have the following characteristics:

- The polymers should be dispersible and more preferably fully soluble in water.
- The polymers should have a significant number of anionic functional groups, preferably at least about 90 mole percent by weight, more preferably at least about 96 mole percent by weight, and most preferably the polymers are essentially free of non-anionic functional groups.
- The polymers are stable thermally and chemically for convenient use.
- The polymers should be essentially free of ester groups, i.e., no more than about 5 mole percent thereof, and most preferably no more than about 1 mole percent.
- The polymers should have only a minimum number of amide-containing repeat units, preferably no more than about 10 mole percent thereof, and more preferably no more than about 5 mole percent.
- The polymers should have only a minimum number of monocarboxylate repeat units, preferably no more than about 10 mole percent thereof, and more preferably no more than about 5 mole percent.

The ensuing detailed description of preferred polymers makes use of the art-accepted term "repeat units" to identify the moieties in the polymers. As used herein, "repeat unit" refers to chemically converted forms (including isomers and enantiomers) of initially chemically complete monomer molecules, where such repeat units are created during polymerization reactions, with the repeat units bonding with other repeat units to form a polymer chain. Thus, a type B monomer will be converted to a type B repeat unit, and type C and type G monomers will be converted type C and G repeat units, respectively. For example, the type B maleic acid monomer will be chemically converted owing to polymerization conditions to the corresponding type B maleic acid repeat unit, as follows:

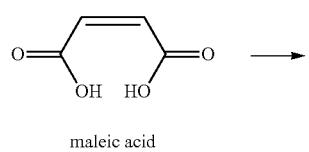

maleic acid

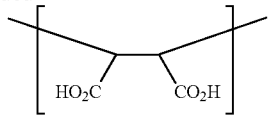

maleic acid repeat unit

Different monomers within a given polymerization mixture are converted to corresponding repeat units, which bond to each other in various ways depending upon the nature of the repeat groups and the polymerization reaction conditions, to create the final polymer chain, apart from end groups.

In carrying out the invention, it has been determined that certain specific families or classes of polymers are particularly suitable. These are described below as "Class I," "Class IA," and "Class II" polymers. Of course, mixtures of these polymer classes are also contemplated.

Class I Polymers

The Class I polyanionic polymers of the present invention are at least tetrapolymers, i.e., they are composed of at least four different repeat units individually and independently selected from the group consisting of type B, type C, and type G repeat units, and mixtures thereof, described in detail below. However, the Class I polymers comprehend polymers having more than four distinct repeat units, with the excess repeat units being selected from the group consisting of type B, type C, and type G repeat units, and mixtures thereof, as well as other monomers or repeat units not being type B, C, or G repeat units.

Preferred Class I polymers contain at least one repeat unit from each of the B, C, and G types, one other repeat unit selected from the group consisting of type B, type C, and type G repeat units, and optionally other repeat units not selected from type B, type C, and type G repeat units. Particularly preferred polymers comprise a single type B repeat unit, a single type C repeat unit, and two different type G repeat units, or two different type B repeat units, a single type C repeat unit, and one or more different type G repeat units.

However constituted, preferred Class I polymers contain at least about 90 mole percent (more preferably at least about 96 mole percent) of repeat units selected from the group consisting of type B, C, and G repeat units (i.e., the polymers should contain no more than about 10 mole percent (preferably no more than about 4 mole percent) of repeat units not selected from types B, C, and G).

The Class I polymers are easily converted to partial or fully saturated salts by a simple reaction with an appropriate salt-forming cation compound. Usable cations can be simple cations such as sodium, but more complex cations can also be used, such as cations containing a metal atom and other atom(s) as well, e.g., vanadyl cations. Among preferred metal cations are those derived from alkali, alkaline earth, and transition metals. The cations may also be amines (as used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species). The most preferred class of amines are alkyl amines, where the alkyl group(s) have from 1-30 carbon atoms and are of straight or branched chain configuration. Such amines should be essentially free of aromatic rings (no more than about 5 mole percent aromatic rings, and more preferably no more than about 1 mole percent thereof). A particularly suitable alkyl amine is isopropylamine. These possible secondary cations should be reacted with no more than about 10 mole percent of the repeat units of the polymer.

1. Type B Repeat Units

Type B repeat units are dicarboxylate repeat units derived from monomers of maleic acid and/or anhydride, fumaric acid and/or anhydride, mesaconic acid and/or anhydride, substituted maleic acid and/or anhydride, substituted fumaric acid and/or anhydride, substituted mesaconic acid and/or anhydride, mixtures of the foregoing, and any isomers, esters, acid chlorides, and partial or complete salts of any of the foregoing. As used herein with respect to the type B repeat units, "substituted" species refers to alkyl substituents (preferably C1-C6 straight or branched chain alkyl groups substantially free of ring structures), and halo substituents (i.e., no more than about 5 mole percent of either ring structures or halo substituents, preferably no more than about 1 mole percent of either); the substituents are normally bound to one of the carbons of a carbon-carbon double bond of the monomer(s) employed. In preferred forms, the total amount of type B repeat units in the Class I polymers of the invention should range from about 1-70 mole percent, more preferably from about 20-65 mole percent, and most preferably from about 35-55 mole percent, where the total amount of all of the repeat units in the Class I polymer is taken as 100 mole percent.

Maleic acid, methylmaleic acid, maleic anhydride, methylmaleic anhydride, and mesaconic acid (either alone or as various mixtures) are the most preferred monomers for generation of type B repeat units. Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial polymerization, this should be followed by hydrolysis (acid or base) of pendant ester groups to generate a final carboxylated polymer substantially free of ester groups.

2. Type C Repeat Units

Type C repeat units are derived from monomers of itaconic acid and/or anhydride, substituted itaconic acid and/or anhydride, as well as isomers, esters, acid chlorides, and partial or complete salts of any of the foregoing. The type C repeat units are present in the preferred Class I polymers of the invention at a level of from about 1-80 mole percent, more preferably from about 15-75 mole percent, and most preferably from about 20-55 mole percent, where the total amount of all of the repeat units in the polymer is taken as 100 mole percent.

The itaconic acid monomer used to form type C repeat unit has one carboxyl group, which is not directly attached to the unsaturated carbon-carbon double bond used in the polymerization of the monomer. Hence, the preferred type C repeat unit has one carboxyl group directly bound to the polymer backbone, and another carboxyl group spaced by a carbon atom from the polymer backbone. The definitions and discussion relating to "substituted," "salt," and useful salt-forming cations (metals, amines, and mixtures thereof) with respect to the type C repeat units, are the same as those set forth for the type B repeat units.

Unsubstituted itaconic acid and itaconic anhydride, either alone or in various mixtures, are the most preferred monomers for generation of type C repeat units. Again, if itaconic anhydride is used as a starting monomer, it is normally useful to convert the itaconic anhydride monomer to the acid form in a reaction vessel just before or even during the polymerization reaction. Any remaining ester groups in the polymer are normally hydrolyzed, so that the final carboxylated polymer is substantially free of ester groups.

3. Type G Repeat Units

Type G repeat units are derived from substituted or unsubstituted sulfonate-bearing monomers possessing at least one carbon-carbon double bond and at least one sulfonate group, in acid, partial or complete salt, or other form, and which are substantially free of aromatic rings and amide groups (i.e., no more than about 5 mole percent of either aromatic rings or amide groups, preferably no more than about 1 mole percent of either). The type G repeat units are preferably selected from the group consisting of C1-C8 straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts. The total amount of type G repeat units in the Class I polymers of the invention should range from about 0.1-65 mole percent, more preferably from about 1-35 mole percent, and most preferably from about 1-25 mole percent, where the total amount of all of the repeat units in the Class I polymer is taken as 100 mole percent. The definitions and discussion relating to "substituted," "salt," and useful salt-forming cations (metals, amines, and mixtures thereof) with respect to the type G repeat units, are the same as those set forth for the type B repeat units.

Vinylsulfonic acid, allylsulfonic acid, and methallylsulfonic acid, either alone or in various mixtures, are deemed to be the most preferred monomers for generation of type G repeat units. It has also been found that alkali metal salts of these acids are also highly useful as monomers. In this connection, it was unexpectedly discovered that during polymerization reactions yielding the novel polymers of the invention, the presence of mixtures of alkali metal salts of these monomers with acid forms thereof does not inhibit completion of the polymerization reaction.

Further Preferred Characteristics of the Class I Polymers

As noted previously, the total abundance of type B, C, and G repeat units in the Class I polymers of the invention is preferably at least about 90 mole percent, more preferably at least about 96 mole percent, and most preferably the polymers consist essentially of or are 100 mole percent B, C, and G-type repeat units. It will be understood that the relative amounts and identities of polymer repeat units can be varied, depending upon the specific properties desired in the resultant polymers. Moreover, it is preferred that the Class I polymers of the invention contain no more than about 10 mole percent of any of (i) non-carboxylate olefin repeat units, (ii) ether repeat units, (iii) ester repeat units, (iv) non-sulfonated monocarboxylic repeat units, and (v) amide-containing repeat units. "Non-carboxylate" and "non-sulfonated" refers to repeat units having essentially no carboxylate groups or sulfonate groups in the corresponding repeat units, namely less that about 55 by weight in the repeat units. Advantageously, the mole ratio of the type B and type C repeat units in combination to the type G repeat units (that is, the mole ratio of (B+C)/G) should be from about 0.5-20:1, more preferably from about 2:1-20:1, and still more preferably from about 2.5:1-10:1. Still further, the polymers should be essentially free (e.g., less than about 1 mole percent) of alkyloxylates or alkylene oxide (e.g., ethylene oxide)-containing repeat units, and most desirably entirely free thereof.

The preferred Class I polymers of the invention have the repeat units thereof randomly located along the polymer chain without any ordered sequence of repeat units. Thus, the polymers hereof are not, e.g., alternating with different repeat units in a defined sequence along the polymer chain.

It has also been determined that the preferred Class I polymers of the invention should have a very high percentage of the repeat units thereof bearing at least one anionic group, e.g., at least about 80 mole percent, more preferably at least about 90 mole percent, and most preferably at least about 95 mole percent. It will be appreciated that the B and C repeat units have two anionic groups per repeat unit, whereas the preferred sulfonate repeat units have one anionic group per repeat unit.

For a variety of applications, certain tetrapolymer compositions are preferred, i.e., a preferred polymer backbone composition range (by mole percent, using the parent monomer names of the corresponding repeat units) is: maleic acid 35-50%; itaconic acid 20-55%; methallylsulfonic acid 1-25%; and allylsulfonic sulfonic acid 1-20%, where the total amount of all of the repeat units in the polymer is taken as 100 mole percent. It has also been found that even small amounts of repeat units, which are neither B nor C repeat units, can significantly impact the properties of the final polymers, as compared with prior BC polymers. Thus, even 1 mole percent of each of 2 different G repeat units can result in a tetrapolymer exhibiting drastically different behaviors, as compared with BC polymers.

The molecular weight of the polymers is also highly variable, again depending principally upon the desired properties. Generally, the molecular weight distribution for polymers in accordance with the invention is conveniently measured by size exclusion chromatography. Broadly, the molecular weight of the polymers ranges from about 800-50,000, and more preferably from about 1000-5000. For some applications, it is advantageous that at least 90% of the finished polymer be at or above a molecular weight of about 1000 measured by size exclusion chromatography in 0.1 M sodium nitrate solution via refractive index detection at 35° C. using polyethylene glycol standards. Of course, other techniques for such measurement can also be employed.

Especially preferred Class I polymers include the following repeat units: maleic—from about 30-55 mole percent, more preferably from about 40-50 mole percent, and most preferably about 45 mole percent; itaconic—from about 35-65 mole percent, more preferably from about 40-60 mole percent, and most preferably about 50 mole percent; methallylsulfonic—from about 1-7 mole percent, more preferably from about 3-6 mole percent, and most preferably about 4 mole percent; and allylsulfonic—from about 0.1-3 mole percent, more preferably from about 0.5-2 mole percent, and most preferably about 1 mole percent. This type of polymer is typically produced as a partial alkali metal salt (preferably sodium) at a pH of from about 0.2-3, more preferably from about 0.3-2, and most preferably about 1. The single most preferred polymer of this type is a partial sodium salt having a pH of about 1, with a repeat unit molar composition of maleic 45 mole percent, itaconic 50 mole percent, methallylsulfonic 4 mole percent, and allylsulfonic 1 mole percent. This specific polymer is referred to herein as the "T5" polymer.

Syntheses of the Class I Polymers

Virtually any conventional method of free radical polymerization may be suitable for the synthesis of the Class I polymers of the invention. However, a preferred and novel synthesis may be used, which is applicable not only for the production of the Class I polymers of the invention, but also for the synthesis of polymers containing dicarboxylate repeat units and sulfonate repeat units and preferably containing at least one carbon-carbon double bond. Such types of polymers are disclosed in U.S. Pat. Nos. 5,536,311 and 5,210,163.

Generally speaking, the new synthesis methods comprise carrying out a free radical polymerization reaction between dicarboxylate and sulfonate repeat units in the presence of hydrogen peroxide and vanadium-containing species to achieve a conversion to polymer in excess of 90%, and more preferably in excess of 98%, by mole. That is, a dispersion of the dicarboxylate and sulfonated monomers is created and free radical initiator(s) are added followed by allowing the monomers to polymerize.

Preferably, the hydrogen peroxide is the sole initiator used in the reaction, but in any case, it is advantageous to conduct the reaction in the absence of any substantial quantities of other initiators (i.e., the total weight of the initiator molecules used should be about 95% by weight hydrogen peroxide, more preferably about 98% by weight, and most preferably 100% by weight thereof). Various sources of vanadium may be employed, with vanadium oxysulfates being preferred.

It has been discovered that it is most advantageous to perform these polymerization reactions in substantially aqueous dispersions (e.g., at least about 95% by weight water, more preferably at least about 98% by weight water, and most preferably 100% by weight water). The aqueous dispersions may also contain additional monomer, but only to the minor extent noted.

It has also been found that the preferred polymerization reactions may be carried out without the use of inert atmospheres, e.g., in an ambient air environment. As is well known in the art, free radical polymerization reactions in dispersions are normally conducted in a way that excludes the significant presence of oxygen. As a result, these prior techniques involve such necessary and laborious steps as degassing, inert gas blanketing of reactor contents, monomer treatments to prevent air from being present, and the like. These prior expedients add to the cost and complexity of the polymerizations, and can present safety hazards. However, in the polymerizations of the polymers of the present invention, no inert gas or other related steps are required, although they may be employed if desired.

One preferred embodiment comprises creating highly concentrated aqueous dispersions of solid monomer particles (including saturated dispersions containing undissolved monomers) at a temperature of from about 50-125° C., more preferably from about 75-110° C., and adding vanadium oxysulfate to give a vanadium concentration in the dispersion of from about 1-1000 ppm, and more preferably from about 5-500 ppm (metals basis). This is followed by the addition of hydrogen peroxide over a period of from about 30 minutes-24 hours (more preferably from about 1-5 hours) in an amount effective to achieve polymerization. This process is commonly carried out in a stirred tank reactor equipped with facilities for controlling temperature and composition, but any suitable equipment used for polymerization may be employed.

Another highly preferred and efficient embodiment involves charging a stirred tank reactor with water, followed by heating and the addition of monomers to give a dispersion having from about 40-75% w/w solids concentration. Where maleic and/or itaconic monomers are employed, they may be derived either from the corresponding acid monomers, or from in situ conversion of the anhydrides to acid in the water. Carboxylate and sulfonated monomers are preferred in their acid and/or anhydride form, although salts may be used as well. Surprisingly, it has been found that incomplete monomer dissolution is not severely detrimental to the polymerization; indeed, the initially undissolved fraction of monomers will dissolve at some time after polymerization has been initiated.

After the initial heating and introduction of monomers, the reactor contents are maintained at a temperature between about 80-125° C., with the subsequent addition of vanadium oxysulfate. Up to this point in the reaction protocol, the order of addition of materials is not critical. After introduction of vanadium oxysulfate, a hydrogen peroxide solution is added over time until substantially all of the monomers are converted to polymer. Peroxide addition may be done at a constant rate, a variable rate, and with or without pauses, at a fixed or variable temperature. The concentration of peroxide solution used is not highly critical, although the concentration on the low end should not dilute the reactor contents to the point where the reaction becomes excessively slow or impractically diluted. On the high end, the concentration should not cause difficulties in performing the polymerization safely in the equipment being used.

Preferably, the polymerization reactions of the invention are carried out to exclude substantial amounts of dissolved iron species (i.e., more than about 5% by weight of such species, and more preferably substantially less, on the order of below about 5 ppm, and most advantageously under about 1 ppm). This is distinct from certain prior techniques requiring the presence of iron-containing materials. Nonetheless, it is acceptable to carry out the polymerization of the invention in 304 or 316 stainless steel reactors. It is also preferred to exclude from the polymerization reaction any significant amounts (nor more than about 5% by weight) of the sulfate salts of ammonium, amine, alkali and alkaline earth metals, as well as their precursors and related sulfur-containing salts, such as bisulfites, sulfites, and metabisulfites. It has been found that use of these sulfate-related compounds leaves a relatively high amount of sulfates and the like in the final polymers, which either must be separated or left as a product contaminant.

The high polymerization efficiencies of the preferred syntheses result from the use of water as a solvent and without the need for other solvents, elimination of other initiators (e.g., azo, hydroperoxide, persulfate, organic peroxides) iron and sulfate ingredients, the lack of recycling loops, so that substantially all of the monomers are converted to the finished polymers in a single reactor. This is further augmented by the fact that the polymers are formed first, and subsequently, if desired, partial or complete salts can be created.

EXAMPLES

The following examples describe preferred synthesis techniques for preparing polymers; it should be understood, however, that these examples are provided by way of illustration only and nothing therein should be taken as a limitation on the overall scope of the invention.

Example 1

Exemplary Synthesis

Apparatus:
A cylindrical reactor was used, capable of being heated and cooled, and equipped with efficient mechanical stirrer, condenser, gas outlet (open to atmosphere), solids charging port, liquids charging port, thermometer and peroxide feeding tube.

Procedure: Water was charged into the reactor, stirring was initiated along with heating to a target temperature of 95° C. During this phase, itaconic acid, sodium methallylsulfonate, sodium allylsulfonate, and maleic anhydride were added so as to make a 50% w/w solids dispersion with the following monomer mole fractions:
maleic: 45%
itaconic: 35%
methallylsulfonate: 15%
allylsulfonate: 5%

When the reactor temperature reached 95° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 5% of the dispersion weight in the reactor prior to peroxide addition. After the peroxide addition was complete, the reactor was held at 95° C. for two hours, followed by cooling to room temperature.

The resulting polymer dispersion was found to have less than 2% w/w total of residual monomers as determined by chromatographic analysis.

Example 2

Exemplary Synthesis

Apparatus:
Same as Example 1
Procedure: Water was charged into the reactor, stirring was initiated along with heating to a target temperature of 100° C. During this phase, itaconic acid, sodium methallylsulfonate, sodium allylsulfonate, and maleic anhydride were added so as to make a 70% w/w solids dispersion with the following monomer mole fractions:
maleic: 45%
itaconic: 50%
methallylsulfonate: 4%
allylsulfonate: 1%

When the reactor temperature reached 100° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 7.5% of the dispersion weight in the reactor prior to peroxide addition. After the peroxide addition was complete, the reactor was held at 100° C. for two hours, followed by cooling to room temperature.

The resulting polymer dispersion was found to have less than 1% w/w total of residual monomers as determined by chromatographic analysis.

Example 3

Preparation of Tetrapolymer Partial Salts

A tetrapolymer calcium sodium salt dispersion containing 40% by weight polymer solids in water was prepared by the preferred free radical polymerization synthesis of the invention, using an aqueous monomer reaction mixture having 45 mole percent maleic anhydride, 35 mole percent itaconic acid, 15 mole percent methallylsulfonate sodium salt, and 5 mole percent allylsulfonate. The final tetrapolymer dispersion had a pH of slightly below 1.0 and was a partial sodium salt owing to the sodium cation on the sulfonate monomers. At least about 90% of the monomers were polymerized in the reaction.

This sodium partial salt tetrapolymer was used to create 40% solids in water calcium salts. In each instance, apart from the sodium present in the tetrapolymer mixture, appropriate bases or base precursors (e.g., carbonates), or mixtures thereof were added to the aqueous tetrapolymer at room temperature to generate the corresponding salts. Specifically, the following basic reactants were employed with quantities of the tetrapolymer to give the following salts:

Salt A—calcium carbonate and a minor amount of sodium hydroxide, pH 1.5.

Salt B—calcium carbonate and a minor amount of sodium hydroxide, pH 3.5.

Example 4

Exemplary Synthesis

A terpolymer salt dispersion containing 70% by weight polymer solids in water was prepared using a cylindrical reactor capable of being heated and cooled, and equipped with an efficient mechanical stirrer, a condenser, a gas outlet open to the atmosphere, respective ports for charging liquids and solids to the reactor, a thermometer, and a peroxide feeding tube.

Water (300 g) was charged into the reactor with stirring and heating to a target temperature of 95° C. During heating, itaconic acid, sodium methallylsulfonate, and maleic anhydride were added so as to make a 75% w/w solids dispersion with the following monomer mole fractions: maleic anhydride—20%; itaconic acid—60%; methallylsulfonate sodium salt—20%. When the monomers were initially added, they were in suspension in the water. As the temperature rose, the monomers became more fully dissolved before polymerization was initiated, and the maleic anhydride was hydrolyzed to maleic acid. When the reactor temperature reached 95° C., vanadium oxysulfate was added to yield a vanadium metal concentration of 50 ppm by weight of the reactor contents at the time of addition of the vanadium salt. After the vanadium salt fully dissolved, hydrogen peroxide was added as a 50% w/w dispersion in water continuously over two hours. At the time of hydrogen peroxide addition, not all of the monomers were completely dissolved, achieving what is sometimes referred to as "slush polymerization"; the initially undissolved monomers were subsequently dissolved during the course of the reaction. The total amount of hydrogen peroxide added equaled 5% of the dispersion weight in the reactor before addition of the peroxide.

After the peroxide addition was completed, the reaction mixture was held at 95° C. for two hours, and then allowed to cool to room temperature. The resulting polymer dispersion had a pH of slightly below 1.0 and was a partial sodium salt owing to the sodium cation on the sulfonate monomers. The dispersion was found to have a monomer content of less than 2% w/w, calculated as a fraction of the total solids in the reaction mixture, as determined by chromatographic analysis. Accordingly, over 98% w/w of the initially added monomers were converted to polymer.

Class IA Polymers

Class IA polymers contain both carboxylate and sulfonate functional groups, but are not the tetra- and higher order polymers of Class I. For example, terpolymers of maleic, itaconic, and allylsulfonic repeat units, which are per se known in the prior art, will function as the polyanionic polymer component of the compositions of the invention. The Class IA polymers thus are normally homopolymers, copolymers, and terpolymers, advantageously including repeat units individually and independently selected from the group consisting of type B, type C, and type G repeat units, without the need for any additional repeat units. Such polymers can be synthesized in any known fashion, and can also be produced using the previously described Class I polymer synthesis.

Class IA polymers preferably have the same molecular weight ranges and the other specific parameters (e.g., pH and polymer solids loading) previously described in connection with the Class I polymers, and may be converted to partial or complete salts using the same techniques described with reference to the Class I polymers.

Further disclosure pertaining to the Class I polymers and uses thereof is set forth in application Ser. No. 62/001,110, filed May 21, 2014, which is fully incorporated by reference herein.

Class II Polymers

Broadly speaking, the polyanionic polymers of this class are of the type disclosed in U.S. Pat. No. 8,043,995, which is attached hereto and is incorporated by reference herein in its entirety. The polymers include repeat units derived from at least two different monomers individually and respectively taken from the group consisting of what have been denominated for ease of reference as B' and C' monomers; alternately, the polymers may be formed as homopolymers or copolymers from recurring C' monomers. The repeat units may be randomly distributed throughout the polymer chains.

In detail, repeat unit B' is of the general formula or

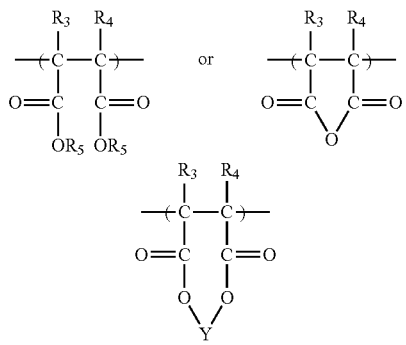

and repeat unit C' is of the general formula

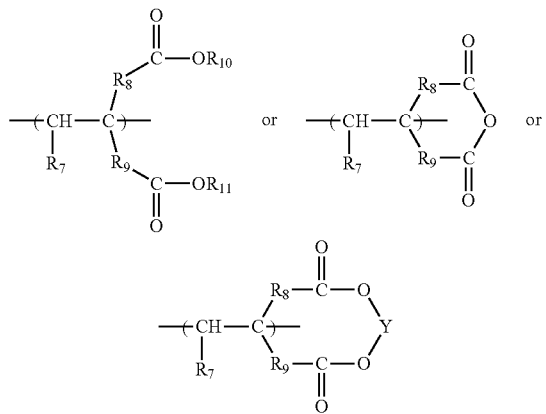

wherein each $R_7$ is individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl formate ($C_0$), acetate ($C_1$), propionate ($C_2$), butyrate ($C_3$), etc. up to $C_{30}$ based ester groups, $R'CO_2$ groups, $OR'$ groups and $COOX$ groups, wherein R' is selected from the group consisting of $C_1$-$C_{30}$ straight, branched chain and cyclic alkyl or aryl groups and X is selected from the group consisting of H, the alkali metals, $NH_4$ and the $C_1$-$C_4$ alkyl ammonium groups, $R_3$ and $R_4$ are individually and respectively selected from the group consisting of H, $C_1$-$C_{30}$ straight, branched chain and cyclic alkyl or aryl groups, $R_5$, $R_6$, $R_{10}$ and $R_{11}$ are individually and respectively selected from the group consisting of H, the alkali metals, $NH_4$ and the $C_1$-$C_4$ alkyl ammonium groups, Y is selected from the group consisting of Fe, Mn, Mg, Zn, Cu, Ni, Co, Mo, V, W, the alkali metals, the alkaline earth metals, polyatomic cations containing any of the foregoing (e.g., $VO^{+2}$), amines, and mixtures thereof; and $R_8$ and $R_9$ are individually and respectively selected from the group consisting of nothing (i.e., the groups are non-existent), $CH_2$, $C_2H_4$, and $C_3H_6$.

As can be appreciated, the Class II polymers typically have different types and sequences of repeat units. For example, a Class II polymer comprising B' and C' repeat units may include all three forms of B' repeat units and all three forms of C' repeat units. However, for reasons of cost and ease of synthesis, the most useful Class II polymers are made up of B' and C' repeat units. In the case of the Class II polymers made up principally of B' and C' repeat units, $R_5$, $R_6$, $R_{10}$, and $R_{11}$ are individually and respectively selected from the group consisting of H, the alkali metals, $NH_4$, and the $C_1$-$C_4$ alkyl ammonium groups. This particular Class II polymer is sometimes referred to as a butanedioic methylenesuccinic acid copolymer and can include various salts and derivatives thereof.

The Class II polymers may have a wide range of repeat unit concentrations in the polymer. For example, Class II polymers having varying ratios of B':C' (e.g., 10:90, 60:40, 50:50 and even 0:100) are contemplated and embraced by the present invention. Such polymers would be produced by varying monomer amounts in the reaction mixture from which the final product is eventually produced and the B' and C' type repeat units may be arranged in the polymer backbone in random order or in an alternating pattern.

The Class II polymers may have a wide variety of molecular weights, ranging for example from 500-5,000,000, depending chiefly upon the desired end use. Additionally, n can range from about 1-10,000 and more preferably from about 1-5,000.

Preferred Class II polymers are usually synthesized using dicarboxylic acid monomers, as well as precursors and derivatives thereof. For example, polymers containing mono and dicarboxylic acid repeat units with vinyl ester repeat units and vinyl alcohol repeat units are contemplated; however, polymers principally comprised of dicarboxylic acid repeat units are preferred (e.g., at least about 85%, and more preferably at least about 93%, of the repeat units are of this character). Class II polymers may be readily complexed with salt-forming cations using conventional methods and reactants.

Synthesis of the Class II Polymers of the Invention

In general, the Class II polymers are made by free radical polymerization serving to convert selected monomers into the desired polymers with repeat units. Such polymers may be further modified to impart particular structures and/or properties. A variety of techniques can be used for generating free radicals, such as addition of peroxides, hydroperoxides, azo initiators, persulfates, percarbonates, per-acid, charge transfer complexes, irradiation (e.g., UV, electron beam, X-ray, gamma-radiation and other ionizing radiation types), and combinations of these techniques. Of course, an extensive variety of methods and techniques are well known in the art of polymer chemistry for initiating free-radical polymerizations. Those enumerated herein are but some of the more frequently used methods and techniques. Any suitable technique for performing free-radical polymerization is likely to be useful for the purposes of practicing the present invention.

The polymerization reactions are carried out in a compatible solvent system, namely a system which does not unduly interfere with the desired polymerization, using essentially any desired monomer concentrations. A number of suitable aqueous or non-aqueous solvent systems can be employed, such as ketones, alcohols, esters, ethers, aromatic solvents, water and mixtures thereof. Water alone and the lower ($C_1$-$C_4$) ketones and alcohols are especially preferred, and these may be mixed with water if desired. In some instances, the polymerization reactions are carried out with the substantial exclusion of oxygen, and most usually under an inert gas such as nitrogen or argon. There is no particular criticality in the type of equipment used in the synthesis of the polymers, i.e., stirred tank reactors, continuous stirred tank reactors, plug flow reactors, tube reactors and any combination of the foregoing arranged in series may be employed. A wide range of suitable reaction arrangements are well known to the art of polymerization.

In general, the initial polymerization step is carried out at a temperature of from about 0° C. to about 120° C. (more preferably from about 30° C. to about 95° C. for a period of from about 0.25 hours to about 24 hours and even more preferably from about 0.25 hours to about 5 hours). Usually, the reaction is carried out with continuous stirring.

After the polymerization reaction is complete, the Class II polymers may be converted to partial or saturated salts using conventional techniques and reactants.

Preferred Class II Maleic-Itaconic Polymers

The most preferred Class II polymers are composed of maleic and itaconic B' and C' repeat units and have the generalized formula

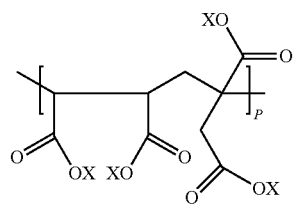

where X is either H or another salt-forming cation, depending upon the level of salt formation.

In a specific example of the synthesis of a maleic-itaconic Class II polymer, acetone (803 g), maleic anhydride (140 g), itaconic acid (185 g) and benzoyl peroxide (11 g) were stirred together under inert gas in a reactor. The reactor provided included a suitably sized cylindrical jacketed glass reactor with mechanical agitator, a contents temperature measurement device in contact with the contents of the reactor, an inert gas inlet, and a removable reflux condenser. This mixture was heated by circulating heated oil in the reactor jacket and stirred vigorously at an internal temperature of about 65-70° C. This reaction was carried out over a period of about 5 hours. At this point, the contents of the reaction vessel were poured into 300 g water with vigorous mixing. This gave a clear solution. The solution was subjected to distillation at reduced pressure to drive off excess solvent and water. After sufficient solvent and water have been removed, the solid product of the reaction precipitates from the concentrated solution, and is recovered. The solids are subsequently dried in vacuo. A schematic representation of this reaction is shown below.

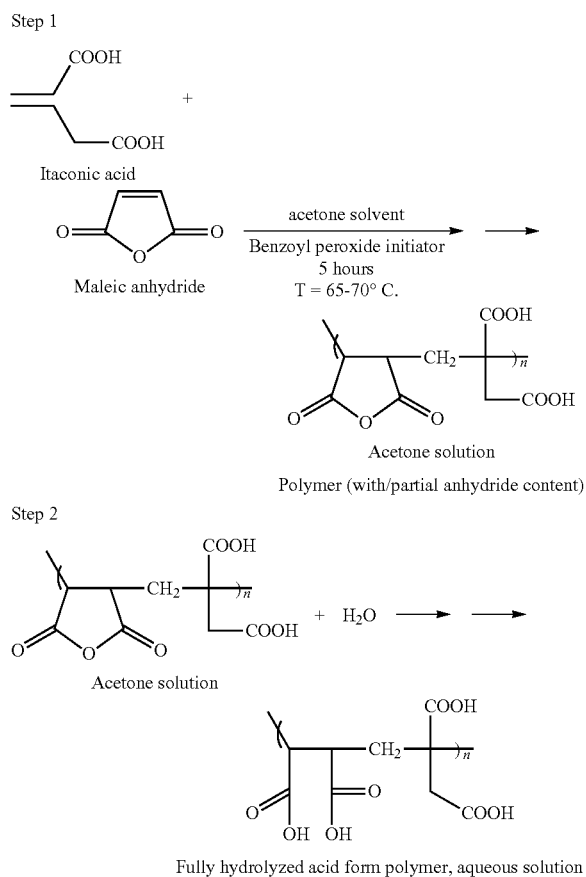

Fully hydrolyzed acid form polymer, aqueous solution

Once again, the Class II polymers should have the same preferred characteristics as those of the Class I and Class IA polymers set forth above.

Fertilizer Actives

A variety of liquid or solid fertilizers may be incorporated into the compositions of the invention, in lieu of or together with synthetic resin polymers. Such fertilizers broadly include ammoniacal, phosphate, potassium, minerals (such as secondary nutrients and micronutrients), mixed NPK fertilizers, and mixtures thereof.

The fertilizers include ammoniacal nitrogen-containing fertilizer, such as those selected from the group consisting of urea, UAN, ammonium nitrate, ammonium sulfate, urea, monoammonium phosphate, diammonium phosphate, sodium nitrate, calcium nitrate, potassium nitrate, nitrate of soda, urea formaldehyde, methyl ammonium phosphate, ammoniated super phosphate, and mixtures thereof. In the case of solid ammoniacal fertilizers such as urea, the solids should be ground to a fine particle size in order to assist in maintaining the products within the liquid matrix. Phosphorous fertilizers include monoammonium phosphate (MAP), diammonium phosphate (DAP), calcium phosphates (normal phosphate and super phosphate), ammonium phosphate, ammonium super phosphate, ammonium polyphosphate, phosphoric acid, basic slag, rock phosphate, colloidal phosphate, bone phosphate, ammonium sulfate, ammonium thiosulfate, and mixtures thereof. The secondary nutrient minerals include calcium, magnesium, and sulfur, either in elemental form or as fertilizer compounds. Micronutrients include zinc, iron, manganese, copper, boron, cobalt, vanadium, selenium, silicon, nickel, and mixtures thereof, which can be in elemental form or as fertilizer compounds. Any normally solid fertilizers are preferably finely ground to facilitate dispersion in the final liquid compositions.

Biocidal Actives

Biocidal actives in liquid or solid form may also be incorporated into the compositions of the invention, in lieu of or in combination with any of the above-described actives. Particularly important are pesticidal actives (e.g., herbicides, insecticides, fungicides, and nematocides), especially the insecticides and herbicides, and mixtures thereof. The well known pyrethroid and organophosphate pesticides are suitable for use in the invention, as well as glyphosate herbicides.

More generally, the pesticides used in the invention are broadly selected from insecticides and herbicides. In the context of insecticides, synthetic pyrethroids and organophosphates are particularly preferred. For example, permethrin ($C_{21}H_{20}C_{1}2O_{3}$, (3-phenoxyphenyl) methyl 3-(2,2-dichloroethenyl)-2,2-dimethyl-cyclopropane-1-carboxylate, CAS#52645-53-1) and bifenthrin ($C_{23}H_{22}C_{1}F_{3}O_{2}$, (2-methyl-3-phenylphenyl) methyl (1S,3S)-3-[(Z)-2-chloro-3,3,3-trifluoroprop-1-enyl]-2,2-dimethylcyclopropane-1-carboxylate, CAS#82657-04-3) are suitable pyrethroids. A typical organophosphate pesticide useful in the invention is malathion ($C_{10}H_{19}O_{6}PS_{2}$,2-(dimethoxyphosphinothioylthio) butanedioic acid diethyl ester, CAS#121-75-5).

More generally, the following insecticides are useful in the invention:

antibiotic insecticides: allosamidin, thuringiensin macrocyclic lactone insecticides
    avermectin insecticides: abamectin, doramectin, emamectin, eprinomectin, ivermectin, selamectin
    milbemycin insecticides: lepimectin, ilbemectin, milbemycin oxime, moxidectin
    spinosyn insecticides: spinetoram, spinosad
arsenical insecticides: calcium arsenate, copper acetoarsenite, copper arsenate, lead arsenate, potassium arsenite, sodium arsenite
botanical insecticides: anabasine, azadirachtin, d-limonene, nicotine, pyrethrins (cinerins (cinerin I, cinerin II), jasmolin I, jasmolin II, pyrethrin I, pyrethrin II), quassia, rotenone, ryania, sabadilla
carbamate insecticides: bendiocarb, carbaryl
    benzofuranyl methylcarbamate insecticides: benfuracarb, carbofuran, carbosulfan, decarbofuran, furathiocarb
    dimethylcarbamate insecticides: dimetan, dimetilan, hyquincarb, pirimicarb
    oxime carbamate insecticides: alanycarb, aldicarb, aldoxycarb, butocarboxim, butoxycarboxim, methomyl, nitrilacarb, oxamyl, tazimcarb, thiocarboxime, thiodicarb, thiofanox
    phenyl methylcarbamate insecticides: allyxycarb, aminocarb, bufencarb, butacarb, carbanolate, cloethocarb, dicresyl, dioxacarb, EMPC, ethiofencarb, fenethacarb, fenobucarb, isoprocarb, methiocarb, metolcarb, mexacarbate, promacyl, promecarb, propoxur, trimethacarb, XMC, xylylcarb
desiccant insecticides: boric acid, diatomaceous earth, silica gel
diamide insecticides: chlorantraniliprole, cyantraniliprole, flubendiamide
dinitrophenol insecticides: dinex, dinoprop, dinosam, DNOC
fluorine insecticides: barium hexafluorosilicate, cryolite, sodium fluoride, sodium hexafluorosilicate, sulfluramid
formamidine insecticides: amitraz, chlordimeform, formetanate, formparanate
fumigant insecticides: acrylonitrile, carbon disulfide, carbon tetrachloride, chloroform, chloropicrin, para-dichlorobenzene, 1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride, tetrachloroethane inorganic insecticides: borax, boric acid, calcium polysulfide, copper oleate, diatomaceous earth, mercurous chloride, potassium thiocyanate, silica gel, sodium thiocyanate, see also arsenical insecticides, see also fluorine insecticides insect growth regulators
- chitin synthesis inhibitors: bistrifluron, buprofezin, chlorfluazuron, cyromazine, diflubenzuron, flucycloxuron, flufenoxuron, hexaflumuron, lufenuron, novaluron, noviflumuron, penfluron, teflubenzuron, triflumuron
- juvenile hormone mimics: epofenonane, fenoxycarb, hydroprene, kinoprene, methoprene, pyriproxyfen, triprene
- juvenile hormones: juvenile hormone I, juvenile hormone II, juvenile hormone III
- moulting hormone agonists: chromafenozide, halofenozide, methoxyfenozide, tebufenozide
- moulting hormones: a-ecdysone, ecdysterone
- moulting inhibitors: diofenolan
- precocenes: precocene I, precocene II, precocene III
- unclassified insect growth regulators: dicyclanil nereistoxin analogue insecticides: bensultap, cartap, thiocyclam, thiosultap nicotinoid insecticides: flonicamid
- nitroguanidine insecticides: clothianidin, dinotefuran, imidacloprid, thiamethoxam
- nitromethylene insecticides: nitenpyram, nithiazine
- pyridylmethylamine insecticides: acetamiprid, imidacloprid, nitenpyram, thiacloprid organochlorine insecticides: bromo-DDT, camphechlor, DDT (pp'-DDT), ethyl-DDD, HCH (gamma-HCH, lindane), methoxychlor, pentachlorophenol, TDE
- cyclodiene insecticides: aldrin, bromocyclen, chlorbicyclen, chlordane, chlordecone, dieldrin, dilor, endosulfan (alpha-endosulfan), endrin, HEOD, heptachlor, HHDN, isobenzan, isodrin, kelevan, mirex organophosphorus insecticides
- organophosphate insecticides: bromfenvinfos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP, tetrachlorvinphos
- organothiophosphate insecticides: dioxabenzofos, fosmethilan, phenthoate
  - aliphatic organothiophosphate insecticides: acethion, amiton, cadusafos, chlorethoxyfos, chlormephos, demephion (demephion-O, demephion-S), demeton (demeton-O, demeton-S), demeton-methyl (demeton-O-methyl, demeton-S-methyl), demeton-S-methylsulphon, disulfoton, ethion, ethoprophos, IPSP, isothioate, malathion, methacrifos, oxydemeton-methyl, oxydeprofos, oxydisulfoton, phorate, sulfotep, terbufos, thiometon
    - aliphatic amide organothiophosphate insecticides: amidithion, cyanthoate, dimethoate, ethoate-methyl, formothion, mecarbam, omethoate, prothoate, sophamide, vamidothion
    - oxime organothiophosphate insecticides: chlorphoxim, phoxim, phoxim-methyl
  - heterocyclic organothiophosphate insecticides: azamethiphos, coumaphos, coumithoate, dioxathion, endothion, menazon, morphothion, phosalone, pyraclofos, pyridaphenthion, quinothion
  - benzothiopyran organothiophosphate insecticides: dithicrofos, thicrofos
  - benzotriazine organothiophosphate insecticides: azinphos-ethyl, azinphos-methyl
  - isoindole organothiophosphate insecticides: dialifos, phosmet
  - isoxazole organothiophosphate insecticides: isoxathion, zolaprofos
  - pyrazolopyrimidine organothiophosphate insecticides: chlorprazophos, pyrazophos
  - pyridine organothiophosphate insecticides: chlorpyrifos, chlorpyrifos-methyl
  - pyrimidine organothiophosphate insecticides: butathiofos, diazinon, etrimfos, lirimfos, pirimiphos-ethyl, pirimiphos-methyl, primidophos, pyrimitate, tebupirimfos
  - quinoxaline organothiophosphate insecticides: quinalphos, quinalphos-methyl
  - thiadiazole organothiophosphate insecticides: athidathion, lythidathion, methidathion, prothidathion
  - triazole organothiophosphate insecticides: isazofos, triazophos
- phenyl organothiophosphate insecticides: azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3, trifenofos phosphonate insecticides: butonate, trichlorfon
phosphonothioate insecticides: mecarphon
- phenyl ethylphosphonothioate insecticides: fonofos, trichloronat
- phenyl phenylphosphonothioate insecticides: cyanofenphos, EPN, leptophos phosphoramidate insecticides: crufomate, fenamiphos, fosthietan, mephosfolan, phosfolan, pirimetaphos
phosphoramidothioate insecticides: acephate, isocarbophos, isofenphos, isofenphos-methyl, methamidophos, propetamphos
phosphorodiamide insecticides: dimefox, mazidox, mipafox, schradan oxadiazine insecticides: indoxacarb
oxadiazolone insecticides: metoxadiazone
phthalimide insecticides: dialifos, phosmet, tetramethrin
pyrazole insecticides: chlorantraniliprole, cyantraniliprole, dimetilan, tebufenpyrad, tolfenpyrad
- phenylpyrazole insecticides: acetoprole, ethiprole, fipronil, pyraclofos, pyrafluprole, pyriprole, vaniliprole pyrethroid insecticides
pyrethroid ester insecticides: acrinathrin, allethrin (bioallethrin), barthrin, bifenthrin, bioethanomethrin, cyclethrin, cycloprothrin, cyfluthrin (beta-cyfluthrin), cyhalothrin, (gamma-cyhalothrin, lambda-cyhalothrin), cypermethrin (alpha-cypermethrin, beta-cypermethrin, theta-cypermethrin, zeta-cypermethrin), cyphenothrin, deltamethrin, dimefluthrin, dimethrin, empenthrin, fenfluthrin, fenpirithrin, fenpropathrin, fenvalerate (esfenvalerate), flucythrinate, fluvalinate (tau-fluvalinate), furethrin, imiprothrin, metofluthrin, permethrin (biopermethrin, transpermethrin), phenothrin, prallethrin, profluthrin, pyresmethrin, resmethrin (bioresmethrin, cismethrin), tefluthrin, terallethrin, tetramethrin, tralomethrin, transfluthrin
pyrethroid ether insecticides: etofenprox, flufenprox, halfenprox, protrifenbute, silafluofen pyrimidinamine insecticides: flufenerim, pyrimidifen
pyrrole insecticides: chlorfenapyr
tetramic acid insecticides: spirotetramat
tetronic acid insecticides: spiromesifen
thiazole insecticides: clothianidin, thiamethoxam
thiazolidine insecticides: tazimcarb, thiacloprid
thiourea insecticides: diafenthiuron
urea insecticides: flucofuron, sulcofuron, see also chitin synthesis inhibitors
unclassified insecticides: closantel, copper naphthenate, crotamiton, EXD, fenazaflor, fenoxacrim, hydramethylnon, isoprothiolane, malonoben, metaflumizone, nifluridide, plifenate, pyridaben, pyridalyl, pyrifluquinazon, rafoxanide, sulfoxaflor, triarathene, triazamate.

The foregoing insecticides, and links for a further identification and description of the insecticides, can be found at http://www.alanwood.net/pesticides/class_insecticides.html, which is incorporated herein in its entirety.

A particularly preferred herbicide is glyphosate (C3H8NO5P, [(phosphonomethyl) amino]acetic acid, CAS#1071-83-6). Other herbicides which can be used in the invention include:

amide herbicides: allidochlor, amicarbazone, beflubutamid, benzadox, benzipram, bromobutide, cafenstrole, CDEA, cyprazole, dimethenamid (dimethenamid-P), diphenamid, epronaz, etnipromid, fentrazamide, flucarbazone, flupoxam, fomesafen, halosafen, isocarbamid, isoxaben, napropamide, naptalam, pethoxamid, propyzamide, quinonamid, saflufenacil, tebutam
  anilide herbicides: chloranocryl, cisanilide, clomeprop, cypromid, diflufenican, etobenzanid, fenasulam, flufenacet, flufenican, ipfencarbazone, mefenacet, mefluidide, metamifop, monalide, naproanilide, pentanochlor, picolinafen, propanil, sulfentrazone arylalanine herbicides: benzoylprop, flamprop (flamprop-M),
    chloroacetanilide herbicides: acetochlor, alachlor, butachlor, butenachlor, delachlor, diethatyl, dimethachlor, metazachlor, metolachlor (S-metolachlor), pretilachlor, propachlor, propisochlor, prynachlor, terbuchlor, thenylchlor, xylachlor
    sulfonanilide herbicides: benzofluor, cloransulam, diclosulam, florasulam, flumetsulam, metosulam, perfluidone, pyrimisulfan, profluazol
  sulfonamide herbicides: asulam, carbasulam, fenasulam, oryzalin, penoxsulam, pyroxsulam, see also sulfonylurea herbicides
  thioamide herbicides: bencarbazone, chlorthiamid
antibiotic herbicides: bilanafos
aromatic acid herbicides:
  benzoic acid herbicides: chloramben, dicamba, 2,3,6-TBA, tricamba
    pyrimidinyloxybenzoic acid herbicides: bispyribac, pyriminobac
    pyrimidinylthiobenzoic acid herbicides: pyrithiobac
  phthalic acid herbicides: chlorthal
  picolinic acid herbicides: aminopyralid, clopyralid, picloram
  quinolinecarboxylic acid herbicides: quinclorac, quinmerac
arsenical herbicides: cacodylic acid, CMA, DSMA, hexaflurate, MAA, MAMA, MSMA, potassium arsenite, sodium arsenite
benzoylcyclohexanedione herbicides: mesotrione, sulcotrione, tefuryltrione, tembotrione
benzofuranyl alkylsulfonate herbicides: benfuresate, ethofumesate benzothiazole herbicides: benazolin, benzthiazuron, fenthiaprop, mefenacet, methabenzthiazuron
carbamate herbicides: asulam, carboxazole, chlorprocarb, dichlormate, fenasulam, karbutilate, terbucarb
carbanilate herbicides: barban, BCPC, carbasulam, carbetamide, CEPC, chlorbufam, chlorpropham, CPPC, desmedipham, phenisopham, phenmedipham, phenmediphamethyl, propham, swep
cyclohexene oxime herbicides: alloxydim, butroxydim, clethodim, cloproxydim, cycloxydim, profoxydim, sethoxydim, tepraloxydim, tralkoxydim
cyclopropylisoxazole herbicides: isoxachlortole, isoxaflutole
dicarboximide herbicides: cinidon-ethyl, flumezin, flumiclorac, flumioxazin, flumipropyn, see also uracil herbicides
dinitroaniline herbicides: benfluralin, butralin, dinitramine, ethalfluralin, fluchloralin, isopropalin, methalpropalin, nitralin, oryzalin, pendimethalin, prodiamine, profluralin, trifluralin
dinitrophenol herbicides: dinofenate, dinoprop, dinosam, dinoseb, dinoterb, DNOC, etinofen, medinoterb
diphenyl ether herbicides: ethoxyfen
  nitrophenyl ether herbicides: acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen, oxyfluorfen
dithiocarbamate herbicides: dazomet, metam
halogenated aliphatic herbicides: alorac, chloropon, dalapon, flupropanate, hexachloroacetone, iodomethane, methyl bromide, monochloroacetic acid, SMA, TCA
imidazolinone herbicides: imazamethabenz, imazamox, imazapic, imazapyr, imazaquin, imazethapyr
inorganic herbicides: ammonium sulfamate, borax, calcium chloride, copper sulfate, ferrous sulfate, potassium azide, potassium cyanate, sodium azide, sodium chlorate, sulfuric acid
nitrile herbicides: bromobonil, bromoxynil, chloroxynil, dichlobenil, iodobonil, ioxynil, pyraclonil
organophosphorus herbicides: amiprofos-methyl, anilofos, bensulide, bilanafos, butamifos, 2,4-DEP, DMPA, EBEP, fosamine, glufosinate (glufosinate-P), glyphosate, piperophos
oxadiazolone herbicides: dimefuron, methazole, oxadiargyl, oxadiazon
oxazole herbicides: carboxazole, fenoxasulfone, isouron, isoxaben, isoxachlortole, isoxaflutole, monisouron, pyroxasulfone, topramezone
phenoxy herbicides: bromofenoxim, clomeprop, 2,4-DEB, 2,4-DEP, difenopenten, disul, erbon, etnipromid, fenteracol, trifopsime
  phenoxyacetic herbicides: 4-CPA, 2,4-D, 3,4-DA, MCPA, MCPA-thioethyl, 2,4,5-T
  phenoxybutyric herbicides: 4-CPB, 2,4-DB, 3,4-DB, MCPB, 2,4,5-TB
  phenoxypropionic herbicides: cloprop, 4-CPP, dichlorprop (dichlorprop-P), 3,4-DP, fenoprop, mecoprop, (mecoprop-P)
    aryloxyphenoxypropionic herbicides: chlorazifop, clodinafop, clofop, cyhalofop, diclofop, fenoxaprop, (fenoxaprop-P), fenthiaprop, fluazifop, (fluazifop-P), haloxyfop, (haloxyfop-P), isoxapyrifop, metamifop, propaquizafop, quizalofop, (quizalofop-P), trifop
phenylenediamine herbicides: dinitramine, prodiamine
pyrazole herbicides: azimsulfuron, difenzoquat, halosulfuron, metazachlor, metazosulfuron, pyrazosulfuron, pyroxasulfone benzoylpyrazole herbicides: benzofenap, pyrasulfotole, pyrazolynate, pyrazoxyfen, topramezone phenylpyrazole herbicides: fluazolate, nipyraclofen, pinoxaden, pyraflufen pyridazine herbicides: credazine, pyridafol, pyridate pyridazinone herbicides: brompyrazon, chloridazon, dimidazon, flufenpyr, metflurazon, norflurazon, oxapyrazon, pydanon pyridine herbicides: aminopyralid, cliodinate, clopyralid, diflufenican, dithiopyr, flufenican, fluroxypyr, haloxydine, picloram, picolinafen, pyriclor, pyroxsulam, thiazopyr, triclopyr pyrimidinediamine herbicides: iprymidam, tioclorim quaternary ammonium herbicides: cyperquat, diethamquat, difenzoquat, diquat, morfamquat, paraquat thiocarbamate herbicides: butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate, vernolate thiocarbonate herbicides: dimexano, EXD, proxan thiourea herbicides: methiuron triazine herbicides: dipropetryn, indaziflam, triaziflam, trihydroxytriazine chlorotriazine herbicides: atrazine, chlorazine, cyanazine, cyprazine, eglinazine, ipazine, mesoprazine, pro cyazine, pro glinaz ine, propazine, sebuthylazine, simazine, terbuthylazine, trietazine methoxytriazine herbicides: atraton, methometon, prometon, secbumeton, simeton, terbumeton methylthiotriazine herbicides: ametryn, aziprotryne, cyanatryn, desmetryn, dimethametryn, methoprotryne, prometryn, simetryn, terbutryn triazinone herbicides: ametridione, amibuzin, hexazinone, isomethiozin, metamitron, metribuzin triazole herbicides: amitrole, cafenstrole, epronaz, flupoxam triazolone herbicides: amicarbazone, bencarbazone, carfentrazone, flucarbazone, ipfencarbazone, propoxycarbazone, sulfentrazone, thiencarbazone triazolopyrimidine herbicides: cloransulam, diclosulam, florasulam, flumetsulam, metosulam, penoxsulam, pyroxsulam uracil herbicides: benzfendizone, bromacil, butafenacil, flupropacil, isocil, lenacil, saflufenacil, terbacil urea herbicides: benzthiazuron, cumyluron, cycluron, dichloralurea, diflufenzopyr, isonoruron, isouron, methabenzthiazuron, monisouron, noruron phenylurea herbicides: anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron, thidiazuron sulfonylurea herbicides:

pyrimidinylsulfonylurea herbicides: amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron triazinylsulfonylurea herbicides: chlorsulfuron, cinosulfuron, ethametsulfuron, iodosulfuron, metsulfuron, prosulfuron, thifensulfuron, triasulfuron, tribenuron, triflusulfuron, tritosulfuron thiadiazolylurea herbicides: buthiuron, ethidimuron, tebuthiuron, thiazafluron, thidiazuron unclassified herbicides: acrolein, allyl alcohol, aminocyclopyrachlor, azafenidin, bentazone, benzobicyclon, bicyclopyrone, buthidazole, calcium cyanamide, cambendichlor, chlorfenac, chlorfenprop, chlorflurazole, chlorflurenol, cinmethylin, clomazone, CPMF, cresol, cyanamide, ortho-dichlorobenzene, dimepiperate, endothal, fluoromidine, fluridone, flurochloridone, flurtamone, fluthiacet, indanofan, methyl isothiocyanate, OCH, oxaziclomefone, pentachlorophenol, pentoxazone, phenylmercury acetate, prosulfalin, pyribenzoxim, pyriftalid, quinoclamine, rhodethanil, sulglycapin, thidiazimin, tridiphane, trimeturon, tripropindan, tritac.

The foregoing herbicides, and links for a further identification and description of the herbicides, can be found at http://www.alanwood.net/pesticides/class_herbicides.html, which is incorporated herein in its entirety.

In many instances, pesticides having an amphoteric or positive surface charge are preferred. Such surface charge characteristics may be inherent in the pesticide employed, or may arise by applying an appropriate cationic or amphoteric surfactant onto the surfaces of pesticide particles. Generally, the surfactants are used at a level of from about 0.01-10% by weight (more preferably from about 0.1-3% by weight) based upon the total weight of the pesticide fraction in the overall composition taken as 100% by weight.

Suitable cationic surfactants include: dieicosyldimethyl ammonium chloride; didocosyldimethyl ammonium chloride; dioctadecyidimethyl ammonium chloride; dioctadecyldimethyl ammonium methosulphate; ditetradecyldimethyl ammonium chloride and naturally occurring mixtures of above fatty groups, e.g., di(hydrogenated tallow)dimethyl ammonium chloride; di(hydrogenated tallow)dimethyl ammonium metho-sulphate; ditallow dimethyl ammonium chloride; and dioleyidimethyl ammonium chloride.

These cationic surfactants also include imidazolinium compounds, for example, 1-methyl-1-(tallowylamido-)ethyl-2-tallowyl4,5-dihydroimidaz-olinium methosulphate and 1-methyl-1-(palmitoylamido)ethyl-2-octadecyl 4,5-dihydroimidazolinium methosulphate. Other useful imidazolinium materials are 2-heptadecyl-1-methyl-1(2-stearoylamido)-ethyl-imidazoliniu-m methosulphate and 2-lauryl-1hydroxyethyl-1-oleyl-imidazolinium chloride.

Further examples of suitable cationic surfactants include: dialkyl(C12-C22)dimethylammonium chloride; alkyl(coconut)dimethylbenzylammonium chloride; octadecylamine acetate salt; tetradecylamine acetate salt; tallow alkylpropylenediamine acetate salt; octadecyltrimethylammonium chloride; alkyl(tallow)trimethylammonium chloride; dodecyltrimethylammonium chlorid; alkyl(coconut)trimethylammonium chloride; hexadecyltrimethylammonium chloride; biphenyltrimethylammonium chloride, alkyl(tallow)imidazoline quaternary salt; tetradecylmethylbenzylammonium chloride; octadecyidimethylbenzylammonium chloride; dioleyidimethylammonium chloride; polyoxyethylene dodecylmonomethylammonium chloride; polyoxyethylene alkyl(C12-C22)benzylammonium chloride; polyoxyethylene laurylmonomethyl ammonium chloride; 1-hydroxyethyl-2-alkyl(tallow)-imidazoline quaternary salt; and a silicone cationic surfactant having a siloxane group as a hydrophobic group, a fluorine-containing cationic surfactant having a fluoroalkyl group as a hydrophobic group.

Amphoteric (Zwitterionic) surfactants have a positive, negative, or both charges on the hydrophilic part of the molecule in acidic or alkaline media. Any suitable amphoteric surfactant may be used. For example, aminoproprionates may be employed where the alkyl chain of the aminoproprionate is preferably between about C.4 and about C.12 and may be branched or linear. The aminoproprionate may also be a sodium alkyl aminoproprionate. One representative commercially available product is sold under the trade name MIRATAINE JC-HA.

Other suitable amphoteric surfactants include, diproprionates such as Mirataine H2C-HA, sultaines such as Mirataine ASC, betaines such as Mirataine BET-O-30, amine oxides such as Barlox 12i and amphoteric imidazoline derivatives in the acetate form, Miranol JEM Conc, diprorionate form, Miranol C2M-SF Conc.), and sulfonates such as Miranol JS Conc.

Other examples of amphoteric surfactants include amino acid, betaine, sultaine, sulfobetaines, carboxylates and sulfonates of fatty acids, phosphobetaines, imidazolinium derivatives, soybean phospholipids, yolk lecithin, the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates and alkyl amphopropionates wherein alkyl represents an alkyl group having 6 to 20 carbon atoms, alkyliminopropionates, alkyl iminodipropionates and alkyl amphopropylsulfonates having between 12 and 18 carbon atoms, alkylbetaines and amidopropylbetaines and alkylsultaines and alkylamidopropylhydroxy sultaines wherein alkyl represents an alkyl group having 6 to 20 carbon atoms.

The Complete Compositions of the Invention

The compositions of the invention contain three principal ingredients, namely anhydrous ammonia, ammonia solution, and active(s). Generally, the anhydrous ammonia is the preponderant ingredient in the compositions and is present at a level of from about 60-90% by weight, more preferably from about 65-85% by weight. The compositions are normally prepared in pressurized tanks, such as conventional anhydrous ammonia tanks.

Where aqueous agricultural actives are used, there are generally two methods of converting the water to ammonia solution. First, the water fraction of a given active is separated from the solids fraction, and the water fraction is ammoniated to create an ammonia solution with only a minor amount of free water. Thereafter, the ammoniated water fraction is recombined with the solids fraction. Alternately, it may be possible to directly ammoniate the water fraction without the need for any solids/liquid separation step. For example, in the case of the previously described polymers in aqueous dispersion (e.g., the NUTRISPHERE-N® product), the aqueous fraction may be directly ammoniated at the end of the polymer synthesis to give the necessary conversion to ammonia solution. This treatment of course raises the overall pH of the polymeric product to the range of around 8-12. In this form, the polymer may be directly introduced into pressurized anhydrous ammonia without encountering the previously described exothermic reaction. However ammoniation of the original water fraction is achieved, the final ammoniated material should be essentially water-free, e.g., no more than about 5% water, more preferably no more than about 1% water.

When use is made of the preferred actives of the invention, namely one or more of the previously described polymers having about 40% by weight polymer dispersed in water, the water content of the dispersion is first converted to ammonium hydroxide or ammonia solution by the introduction of ammonia into the aqueous polymer dispersion. When the dispersion is essentially water-free, it can be readily added to anhydrous ammonia to form the final composition, usually by pressure injection to overcome the pressure in the anhydrous ammonia tank. Usage of this type of ammoniated polymer product is normally at a level of from about 12-45 ounces per acre of applied ammonia, more preferably from about 18-35 ounces per acre, and most preferably at 30 ounces per acre. That is, a grower would select a rate of ammonia/acre to be applied, and the ammoniated polymer product would be added to the anhydrous ammonia in a corresponding amount.

In instances where other types of actives are used, e.g., non-aqueous polymers, fertilizers, or biocidal actives, these can be added to the anhydrous ammonia directly or premixed with ammonia solution before introduction into the anhydrous ammonia. The actives may be used at a level of from about 0.5-10% by weight, and more preferably from about 1-8% by weight, based upon the total weight of the compositions taken as 100% by weight.

When finally mixed, the compositions of the invention may be applied to plants (foliar), the soil adjacent plants, or seeds. The presence of anhydrous ammonia provides the usual fertilizing effect, whereas the agricultural active(s) provide further beneficial effects.

I claim:

1. A method of formulating an agriculturally useful composition comprising the steps of mixing together anhydrous ammonia, ammonia solution, and a agricultural active different than said anhydrous ammonia, said active comprising a polyanionic polymer.

2. The method of claim 1, said anhydrous ammonia being the preponderant ingredient of said composition.

3. The method of claim 1, the pH of said composition being from about 8-13.

4. The method of claim 1, said agricultural active further comprising an active selected from the group consisting of one or more mineral-containing fertilizers, synthetic resin polymers, pesticides, and mixtures thereof.

5. The method of claim 4, said one or more fertilizers selected from the group consisting of nitrogenous, ammoniacal, and mixed NPK fertilizers, macronutrients, micronutrients, minerals, and mixtures thereof.

6. The method of claim 1, said polyanionic polymer containing maleic and itaconic repeat units.

7. The method of claim 6, said polyanionic polymer further including sulfonate repeat units.

8. The method of claim 7, said polyanionic polymer comprising at least four repeat units distributed along the length of the polymer chain, said repeat units including at least one each of a maleic, itaconic, and sulfonate repeat unit.

9. The method of claim 1, said synthetic resin polymers being dispersed in ammonia solution, said method comprising the step of synthesizing said polymers to produce an aqueous mixture of the polymers in water, and ammoniating said water to produce said ammonia solution.

10. The method of claim 1, said synthetic resin polymers being dispersed in ammonia solution, said method comprising the step of synthesizing said polymers to produce an aqueous mixture of the polymers in water, separating said water from said polymers, ammoniating said separated water to produce said ammonia solution, and then suspending said polymers in said produced ammonia solution.

11. The method of claim 1, said anionic polymer comprising at least four repeat units distributed along the length of the polymer chain, said at least four repeat units including at least one each of type B, type C, and type G repeat units, said type B repeat units selected from the group consisting of repeat units derived from substituted and unsubstituted monomers of maleic acid and/or anhydride, fumaric acid and/or anhydride, mesaconic acid and/or anhydride, mixtures of the foregoing, and any isomers, esters, acid chlorides, and partial or complete salts of any of the foregoing, wherein type B repeat units may be substituted with one or more C1-C6 straight or branched chain alkyl groups substantially free of ring structures and halo atoms, and wherein the salts have salt-forming cations selected from the group consisting of metals, amines, and mixtures thereof, said type C repeat units selected from the group consisting of repeat units derived from substituted or unsubstituted monomers of itaconic acid, itaconic anhydride, and any isomers, esters, and the partial or complete salts of any of the foregoing, and mixtures of any of the foregoing, wherein the type C repeat units may be substituted with one or more C1-C6 straight or branched chain alkyl groups substantially free of ring structures and halo atoms, and wherein the salts have salt-forming cations selected from the group consisting of metals, amines, and mixtures thereof, said type G repeat units selected from the group consisting of repeat units derived from substituted or unsubstituted sulfonated monomers possessing at least one carbon-carbon double bond and at least one sulfonate group and which are substantially free of aromatic rings and amide groups, and any isomers, and the partial or complete salts of any of the foregoing, and mixtures of any of the foregoing, wherein type G repeat units may be substituted with one or more C1-C6 straight or branched chain alkyl groups substantially free of ring structures and halo atoms, and wherein the salts of the type G repeat units have salt-forming cations selected from the group consisting of metals, amines, and mixtures thereof, at least about 90 mole percent of the repeat units therein are selected from the group consisting of type B, C, and G repeat units, and mixtures thereof, said repeat units being randomly located along the polymer, said polymer containing no more than about 10 mole percent of any of (I) non-carboxylate olefin repeat units, (ii) ether repeat units, and (iii) non-sulfonated monocarboxylic repeat units.

12. The method of claim 11, wherein at least about 96 mole percent of the repeat units therein are selected from the group consisting of type B, C, and G repeat units, and mixtures thereof.

13. The method of claim 12, wherein the repeat units consist essentially of repeat units selected from the group consisting of type B, C, and G repeat units, and mixtures thereof.

14. The method of claim 11, said polymer having one type B repeat unit, one type C repeat unit, and two different type G repeat units.

15. The method of claim 14, said polymer being a tetrapolymer, said one type B repeat unit is derived from maleic acid, said one type C repeat unit is derived from itaconic acid, and two type G repeat units are respectively derived from methallylsulfonic acid and allylsulfonic acid.

16. The method of claim 15, said type B repeat unit being present at a level of from about 35-55 mole percent, said type C repeat unit being present at a level of from about 20-55 mole percent, said type G repeat unit derived from methallylsulfonic acid being present at a level of from about 1-25 mole percent, and said type G repeat unit derived from allylsulfonic acid being present at a level of from about 1-25 mole percent, where the total amount of all of the repeat units in the polymer is taken as 100 mole percent.

17. The method of claim 11, the total amount of type B repeat units in said polymer is from about 1-70 mole percent, the total amount of type C repeat units in said polymer is from about 1-80 mole percent, and the total amount of type G repeat units in said polymer is from about 0.1-65 mole percent, where the total amount of all of the repeat units in the polymer is taken as 100 mole percent.

18. The method of claim 11, said polymer having a molecular weight of from about 800-50,000.

19. The method of claim 11, said polymer being in free acid, partial salt, or complete salt form.

20. The method of claim 19, said partial or complete salt forms having one or more cations bonded to said polymer said cation selected from the group consisting of cations of metals, amines, micronutrients, and mixtures thereof.

21. The method of claim 1, said anhydrous ammonia being present in said composition at a level of from about 60-90% by weight.

22. The method of claim 1, said active being present in said composition at a level of from about 0.5-10% by weight.

* * * * *